United States Patent [19]

Minagawa et al.

[11] 4,104,358

[45] Aug. 1, 1978

[54] SELECTIVE EXTRACTION OF YTTRIUM IONS

[75] Inventors: Yukinori Minagawa, Yokohama; Tsugio Kaneko; Fumikazu Yajima, both of Tokyo; Kunihiko Yamaguchi, Yokohama; Toshihiko Yoshitomi, Kawasaki, all of Japan

[73] Assignee: Mitsubishi Chemical Industries Ltd., Tokyo, Japan

[21] Appl. No.: 804,465

[22] Filed: Jun. 7, 1977

[30] Foreign Application Priority Data

Jun. 11, 1976 [JP] Japan .................................. 51-68332

[51] Int. Cl.$^2$ .............................................. C01F 17/00
[52] U.S. Cl. ................................. 423/21; 75/101 BE; 423/658.5
[58] Field of Search ...................... 423/21, 263, 658.5; 75/101 BE

[56] References Cited

U.S. PATENT DOCUMENTS

| 3,192,012 | 6/1965 | Rice | 423/21 |
| 3,463,619 | 8/1969 | Ritter et al. | 423/21 |
| 3,578,391 | 3/1971 | Chiola et al. | 423/21 |
| 3,640,678 | 2/1972 | Trimble et al. | 423/21 |
| 3,658,486 | 4/1972 | Goto | 423/21 |
| 3,715,424 | 2/1973 | Greimacher et al. | 423/21 |
| 3,751,553 | 8/1973 | Gaudernack et al. | 423/21 |
| 3,821,352 | 6/1974 | Gaudernack et al. | 423/21 |

FOREIGN PATENT DOCUMENTS 46-6,706  2/1971  Japan ......................................... 423/21

OTHER PUBLICATIONS

Asher et al., "I & EC Process Design & Development", vol. 1, 1962, pp. 52–56.
Harder et al., "J. Inorganic & Nuclear Chemistry", vol. II, 1959, pp. 197–209.
Brown et al., "Proceedings of the 7th Rare Earth Research Conference", vol. 1, 10/68, Coronado, Calif., pp. 385–396.

*Primary Examiner*—Herbert T. Carter
*Attorney, Agent, or Firm*—Oblon, Fisher, Spivak, McClelland & Maier

[57] ABSTRACT

Yttrium ions are selectively extracted by contacting an acid phosphoric ester with an aqueous solution containing diethylenetriaminepentaacetic acid and yttrium ions and one or more heavy rare earth (atomic number of 64 to 71) ions.

7 Claims, 5 Drawing Figures

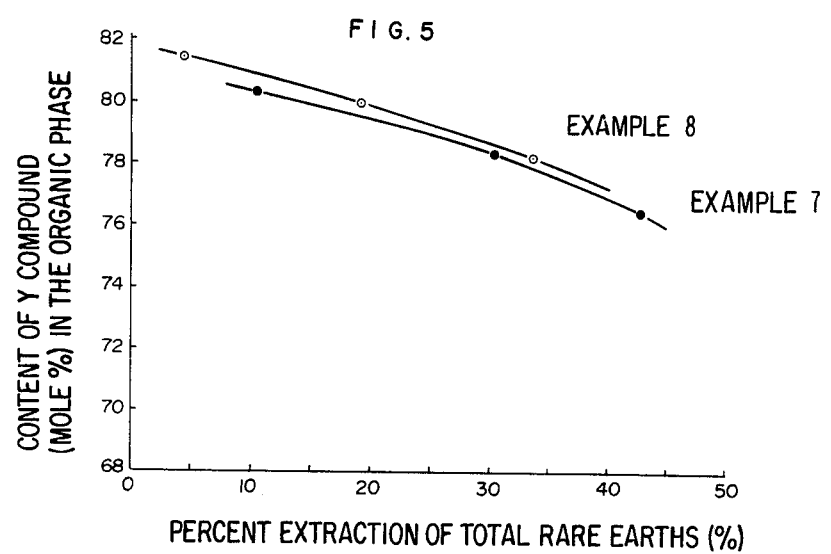

SELECTIVE EXTRACTION OF YTTRIUM IONS

BACKGROUND OF THE INVENTION

The present invention relates to a selective extraction of yttrium ions.

Yttrium (Y; atomic number 39) compounds have been widely used as the raw material of red fluorescent substance of a Color TV. The yttrium compounds have been also widely used in the other electronics fields such as additive for optical lens, and the yttrium compounds become important substance as industrial sources.

As a selective extraction of yttrium ions from an aqueous solution containing yttrium ions and other rare earth ions, it has been known to separate the yttrium ions by selectively extracting with an extracting reagent of a phosphoric ester. According to the conventional method, the yttrium ions could be separated from the light rare earth ions such as La, Ce, Pr, Nd, Pm, Sm, Eu components etc. However, a satisfactory result could not be attained for the separation of yttrium ions from the heavy rare earth (atomic number of 64 to 71) ions.

The ion-exchange method for selectively extracting yttrium ions by passing an aqueous solution containing yttrium ions and the heavy rare earth ions through a column packed with an ion-exchange resin has been usually used for the separation of yttrium ions from the heavy rare earth ions.

However, in the ion-exchange method, a diluted aqueous solution having low concentration should be used, whereby the concentration of the purified aqueous solution containing yttrium ions is quite low and a large apparatus and a large heat source are required for the concentration of the aqueous solution, and moreover, a flow rate of an eluent passed through the column of the ion-exchange resin is slow. Accordingly, the productivity is low.

It has been also known to separate yttrium ions from the heavy rare earth ions by the method of selectively extracting the yttrium ions by using a cation exchange liquid and an anion exchange liquid in the presence of a nitrate (U.S. Pat. No. 3,575,687) or the method of selectively extracting yttrium ions with an extracting reagent of a quaternary ammonium compound in the presence of thiocyanate ions (Japanese Patent Publication No. 4328/1970 and Japanese Unexamined Patent Publication No. 103815/1974).

However, these methods have not been satisfactory.

In the former method, the separation factor of yttrium ions from the heavy rate earth ions has been low such as about 2 to 3, and in order to obtain an yttrium compound having high purity, several tens extraction stages have been required.

In the latter method, thiocyanate ions are easily decomposed and the decomposed material may be precipitated or HCN may be produced in the extracting operation. Accordingly, the operation control has not been easy and in order to obtain an yttrium compound having high purity, several tens extraction stages have been also required.

SUMMARY OF THE INVENTION

It is an object of the present invention to provide a novel selective extraction of yttrium ions from heavy rare earth (atomic number of 64 to 71) ions by a simple method in high efficiency.

The foregoing and other objects of the present invention have been attained by contacting an acid phosphoric ester such as di-(2-ethylhexyl)phosphoric acid (hereinafter referring to as D2EHPA) with an aqueous solution containing diethylenetriaminepentaacetic acid (hereinafter referring to as DTPA) and yttrium ions and one or more rare earth (atomic number of 64 to 71) ions such as ions of gadolinium (Gd: 64); terbium (Tb: 65); dysprosium (Dy: 66); holmium (Ho: 67); erbium (Er: 68); thulium (Tm: 69); Ytterbium (Yb: 70); or lutetium (Lu: 71).

BRIEF DESCRIPTION OF THE DRAWINGS

FIG. 5 is a plot of the yttrium content of the organic phase vs. % extraction of total rare earths.

DETAILED DESCRIPTION OF THE PREFERRED EMBODIMENTS

Figure 1:
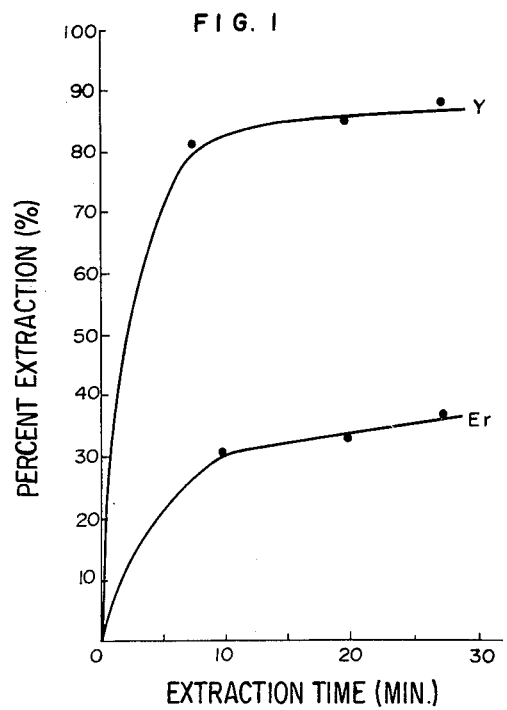
FIG. 1 is a plot % extraction vs. extraction time.

When yttrium ions are separated from a mixture of yttrium ions and light and heavy rare earth ions, the light rare earth ions which are easily separated, are firstly separated by the conventional method. For example, an aqueous solution containing various rare earth ions is treated with an acid phosphoric ester e.g. D2EHPA which is diluted with an organic diluent to extract heavy rare earth ions and to remain light rare earth ions in water phase.

The organic solvent containing yttrium ions and the heavy rare earth (atomic number of 64 to 71) ions or the aqueous solution containing yttrium ions and the heavy rare earth ions which are obtained by said treatment, can be treated in accordance with the selective extraction of the present invention.

The object mixture used in the present invention is a mixture of yttrium ions and at least one of heavy rare earth (atomic number of 64 to 71) ions. The selective extraction of the present invention is especially preferable to separate yttrium ions from the rare earth (atomic number of 66 to 71 from Dy to Lu) ions.

The concentration of total yttrium ions and the heavy rare earth ions in the aqueous solution used in the selective extraction of the present invention is dependent upon the percent extraction and the extraction time and is usually in a range of 0.005 to 2 mole/liter especially 0.05 to 0.5 mole/liter as Y ions and other rare earth ions.

In the separation of the present invention, the aqueous solution containing yttrium ions and the heavy rare earth ions is treated with an acid phosphoric ester or a solution of the acid phosphoric acid ester diluted with suitable organic diluent to selectively extract yttrium ions in the organic phase and to leave the heavy rare earth (atomic number of 64 to 71) ions in the water phase in the presence of DTPA.

The acid phosphoric esters used in the present invention have the formula

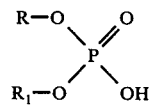

wherein R represents a $C_4$–$C_{18}$ aliphatic hydrocarbon group or aryl group and $R_1$ represents a $C_4$–$C_{18}$ aliphatic hydrocarbon group, aryl group or hydrogen atom.

Among them, di-(2-ethylhexyl) phosphoric acid (D2EHPA) is easily available. Suitable acid phosphoric esters include dibutyl phosphoric acid, monooctyl phosphoric acid, monodecyl phosphoric acid, octylphenyl phosphoric acid, etc. The amount of the acid phosphoric ester is usually more than equivalent preferably 1.5 to 3 equivalents to total of Y ions and other rare earth ions (measured by a titration with xylenol-orange).

When the amount of the acid phosphoric ester is smaller, a gelation is caused in the organic phase after the extraction whereby the phase separation is prevented. The acid phosphoric ester is preferably used with an organic diluent because of lowering the viscosity and improving the extraction.

Suitable organic diluents include aliphatic diluents such as kerosene, hexane, octane, decane, hexanol, octanol, butyl ether and isopropyl ether and aromatic diluents such as benzene, toluene, xylene, ethyl benzene, and nitrobenzene. A mixture of the diluents can be also effectively used. It is preferable to use a $C_{10}$–$C_{14}$ aliphatic hydrocarbon or a $C_6$–$C_{10}$ aliphatic alcohol from the viewpoint of the extraction velocity. It is also preferable to use ethylbenzene, TOA-kerosene type solvent, TOA-toluene type solvent, TBP-kerosene type solvent and TBP-toluene type solvent, wherein TOA represents trioctylamine and TBP represents tributylphosphate, from the viewpoint of the extraction efficiency.

It is preferable to select the amount of the organic diluent so as to give 0.1 to 1.5 mole/liter preferably 0.2 to 1.0 mole/liter of a concentration of the acid phosphoric ester, from the viewpoint of the extracting operation.

When TOA or TBP is combined with kerosene or toluene, the organic diluent is prepared as follows.

When TOA is used, TOA is added at a volume ratio of 0.1 to 2.0 times to D2EHPA in the diluent and then, kerosene or toluene is added for the dilution to give 0.1 to 1.5 mole/liter preferably 0.2 to 1.0 mole/liter of a concentration of D2EHPA.

On the other hand, when TBP is used, TBP is added at a volume ratio of 0.5 to 4.0 times to D2EHPA in the diluent and then, kerosene or toluene is added for the dilution to give 0.1 to 1.5 mole/liter preferably 0.2 to 1.0 mole/liter of D2EHPA.

On the other hand, the amount of DTPA is usually more than equivalent to the heavy rare earth (atomic number of 64 to 71) ions and it is preferably in a range of 0.4 to 1.5 times of equivalent to total of Y ions and the heavy rare earth ions. It is preferable to adjust pH of the aqueous solution containing yttrium ions and the heavy rare earth ions and DTPA to higher than 1.5 especially about 6 to 9 from the industrial viewpoint.

When pH of the aqueous solution is lower than 1.5, satisfactory result of the selective extraction cannot be expected.

The treatment of an aqueous solution containing yttrium ions and erbium ions in the present invention will be illustrated in detail.

An aqueous solution containing 0.45 mole/liter of $YCl_3$, 0.05 mole/liter of $ErCl_3$ and 0.55 mole/liter of DTPA was used, under adjusting pH to 8.6 with ammonia water, as a feed solution. The feed solution was treated with 1 mole/liter of D2EHPA diluted with kerosene as the extracting reagent at a ratio of 1 : 3.5 by volume of water phase to organic phase in the extraction of Y ions from Er ions. The relation of the extraction time and the percent extraction is shown in FIG. 1. The percent extraction of Y ions and Er ions on ordinate increases depending upon the increase of the extraction time on abscissa. However, the extracting velocity of Y ions is remarkably faster than the extracting velocity of Er ions whereby Y ions are concentrated in the organic phase whereas Er ions are concentrated in the water phase.

With regard to the heavy rare earth ions such as Dy, Ho and Yb ions, the extracting velocity of Y ions is remarkably faster than those of the heavy rare earth ions as the same with that of Er ions.

Figure 2:
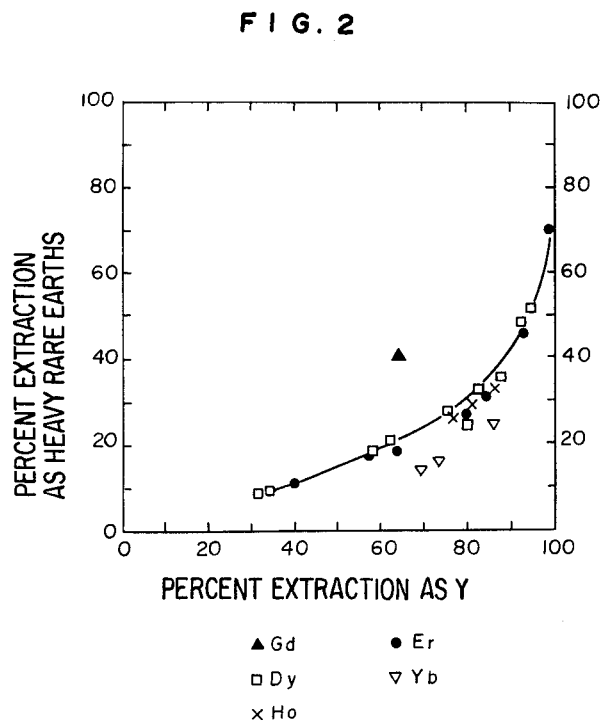
FIG. 2 is a plot of % extraction of heavy rare earths vs. % extraction of yttrium.

From the result, the relation of the percent extraction of Y ions (abscissa) and the percent extraction of the heavy rare earth ions (ordinate) is shown in FIG. 2.

As it is clear from FIG. 2, when the percent extraction of Y ions is 80%, only about 30% of the Dy, Ho and Er ions are extracted, and only about 20% of Yb ions are extracted.

The extracting velocity of Y ions and the rare earth ions is varied depending upon pH of the feed solution, the concentration of Y ions and the other rare earth ions, the amount of DTPA and the formula and amount of the extracting reagent. However, the relation of the percent extraction of Y ions and the percent extraction of the heavy rare earth (atomic number of 64 to 71) ions shown in FIG. 2 is not affected by these factors.

The method of obtaining a Y compound having high purity from a crude $Y_2O_3$ containing various other light and heavy rare earth ions as impurities will be illustrated in detail.

The crude $Y_2O_3$ ($Y_2O_3$: 60%) was dissolved in an acid such as HCl, $HNO_3$ or $H_2SO_4$, to prepare an aqueous solution. The Y ions and the heavy rare earth ions (Dy and higher elements) are extracted in an organic phase by the conventional method using the acid phosphoric ester and the light rare earth ions (Tb and lower elements) are left in the water phase. The Y ions and the heavy rare earth ions in the organic phase are back-extracted with an aqueous solution of an acid such as HCl, $HNO_3$, $H_2SO_4$, etc.

DTPA and a base are added to the aqueous solution containing the acid, Y ions and the heavy rare earth ions to adjust to suitable pH and then the aqueous solution is treated with an acid phosphoric ester for suitable time to selectively extract Y ions in the organic phase and to leave the heavy rare earth ions (Dy or higher elements) in the water phase.

The Y ions in the organic phase is back-extracted with an acid such as HCl, $HNO_3$, $H_2SO_4$, etc. and then the aqueous solution is also treated with the extracting reagent to extract Y ions. Thus, the operation of selective extraction is repeated for 7 to 8 times to obtain Y ions having a purity of higher than 99.9%.

In accordance with the purification of Y ions of the present invention, a Y compound having high purity can be obtained by the selective extraction of Y ions from the heavy rare earth ions with one extracting reagent (acid phosphoric ester) for less extracting operations in comparison with the conventional methods.

EXAMPLE 1

An aqueous solution containing 0.05 mole/liter of $YCl_3$, 0.05 mole/liter of $DyCl_3$ and 0.08 mole/liter of DTPA was used as a feed solution under adjusting pH to 7.2. A 100 ml of the feed solution was extracted with 100 ml of kerosene containing 1 mole/liter of D2EHPA for 5 min. whereby the organic phase, 80.3% of Y compound was extracted but only 24.5% of Dy compound was extracted.

EXAMPLE 2

An aqueous solution containing 0.05 mole/liter of $Y(NO_3)_3$, 0.05 mole/liter of $Er(NO_3)_3$ and 0.1 mole/liter of DTPA was used as a feed solution under adjusting pH to 7.0. A 100 ml of the feed solution was extracted with 100 ml of kerosene containing 1 mole/liter of D2EHPA for 20 min. whereby in the organic phase, 84.4% of Y compound was extracted but only 30.9% of Er compound was extracted.

EXAMPLE 3

An aqueous solution containing 0.05 mole/liter of $YCl_3$, 0.05 mole/liter of $GdCl_3$ and 0.11 mole/liter of DTPA was used as a feed solution under adjusting pH to 8.6. A 100 ml of the feed solution was extracted with 100 ml of kerosene containing 1 mole/liter of D2EHPA for 15 min. whereby in the organic phase, 63% of Y compound was extracted but only 40% of Gd compound was extracted.

EXAMPLE 4

An aqueous solution prepared by dissolving the crude $Y_2O_3$ including the other rare earth elements as impurities shown in Table 1 in HCl in a concentration of 0.25 mole/liter and adjusting pH to 0.2 was used as a feed solution. An extraction of the feed solution with a kerosene containing 1.0 mole/liter of D2EHPA was carried out at a ratio of 1 : 1 by volume of the feed solution to the solvent, to obtain the mixture of Y and the heavy rare earth compounds. The mixture was used as the starting material for the selective extraction of Y ions from the heavy rare earth ions. The contents of the heavy rare earth compounds are shown in Table 2.

An aqueous solution containing 0.1 mole/liter of the crude $Y_2O_3$ of the mixture of Y ions and the other rare earth ions and 0.11 mole/liter of DTPA was used as a feed solution under adjusting pH to 8.6. A 100 ml of the feed solution was extracted with 100 ml of kerosene containing 1 mole/liter of D2EHPA for 10 minutes. The extraction was repeated for 7 times whereby the contents of the heavy rare earth compounds could be decreased as shown in Table 2.

Table 1

Contents of impurities of rare earth compounds in Crude $Y_2O_3$:

| | (wt.%) | | |
|---|---|---|---|
| $La_2O_3$ | 3.0 | $Dy_2O_3$ | 9.0 |
| $Ce_2O_3$ | 4.0 | $Ho_2O_3$ | 3.0 |
| $Pr_6O_{11}$ | 0.5 | $Er_2O_3$ | 6.0 |
| $Nd_2O_3$ | 2.0 | $Tm_2O_3$ | 0.5 |
| $Sm_2O_3$ | 1.5 | $Yb_2O_3$ | 5.0 |
| $Gd_2O_3$ | 4.0 | $Lu_2O_3$ | 0.5 |
| $Tb_4O_7$ | 1.0 | | |

Table 2

Contents of impurities of rare earth elements before and after extraction:

| | Contents before extraction | | Contents after extraction for 7 times |
|---|---|---|---|
| $Dy_2O_3$ | 6.4 | wt.%/$Y_2O_3$ | 100 ppm/$Y_2O_3$ |
| $Ho_2O_3$ | 3.2 | " | <20 " |
| $Er_2O_3$ | 7.8 | " | 100 " |
| $Tm_2O_3$ | 0.9 | " | <20 " |
| $Yb_2O_3$ | 9.6 | " | 30 " |

Table 2-continued

Contents of impurities of rare earth elements before and after extraction:

| | Contents before extraction | | Contents after extraction for 7 times |
|---|---|---|---|
| $Lu_2O_3$ | 1.0 | " | <20 " |

EXAMPLE 5

Figure 3:
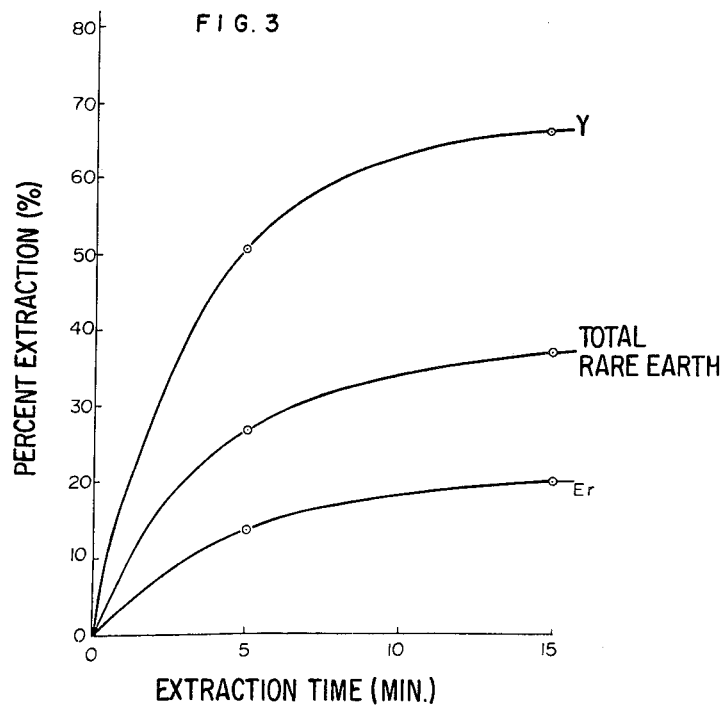
FIGS. 3 and 4 are plots of % extraction vs. extraction time.

An aqueous solution containing 0.05 mole/liter of $YCl_3$, 0.05 mole/liter or $ErCl_3$ and 0.11 mole/liter of DTPA was used as a feed solution under adjusting pH to 3.3 with a HCl-$CH_3COONH_4$ buffer solution (0.5 mole/liter of $CH_3COONH_4$). A 100 ml of the feed solution was extracted with 100 ml of decane containing 0.5 mole/liter of D2EHPA for 5 minutes and 15 minutes, respectively. The percent extraction of total components, and contents of Y and Er compounds in the organic phase at each extraction time of 5 minutes or 15 minutes are shown in FIG. 3.

EXAMPLE 6

Figure 4:
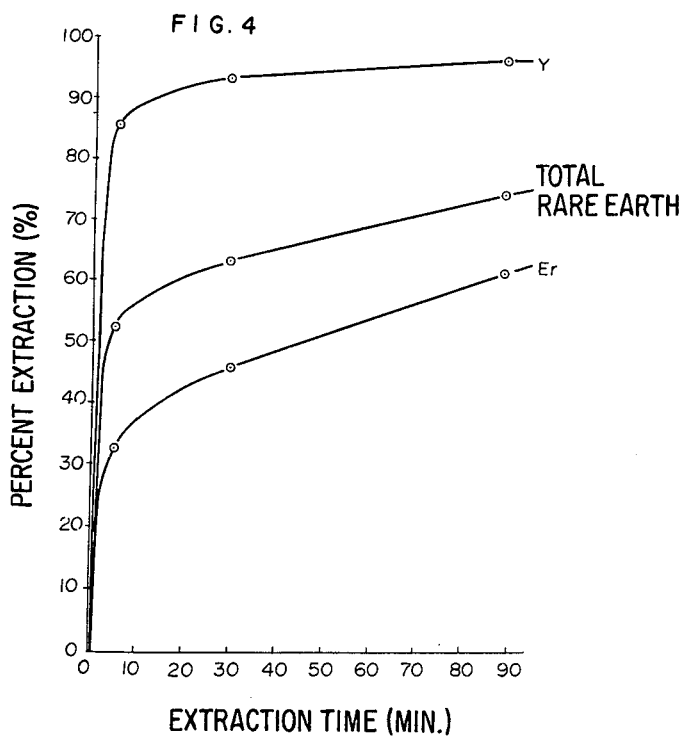

A 100 ml of the feed solution of Example 5 was extracted with 100 ml of n-hexanol containing 0.5 mole/liter of D2EHPA for 5 min., 30 min., and 90 min., respectively. The percent extraction of total components, and the contents of Y and Er compounds in the organic phase at each extracting time are shown in FIG. 4.

EXAMPLE 7

An aqueous solution containing 0.05 mole/liter of $YCl_3$, 0.05 mole/liter of $ErCl_3$ and 0.11 mole/liter of DTPA was used as a feed solution under adjusting pH to 3.3. A 100 ml of the feed solution was extracted with 100 ml of ethylbenzene containing 0.5 mole/liter of D2EHPA for 5 min., and 90 min., respectively. The extractabilities of total components and the contents of Y (mole %) in the organic phase are shown in FIG. 5. The percent extraction of total components at the extraction time of 5 min., 30 min., and 90 min. were respectively 10.3%, 30.1%, and 42.5%, whereas the contents of Y compound in the organic phase at the extraction time of 5 min., 30 min., and 90 min. were respectively 80.3%, 78.4%, and 76.5%.

EXAMPLE 8

A 100 ml of the feed solution of Example 7 was extracted with 100 ml of a mixture of kerosene and trioctylamine containing 0.5 mole/liter of DEHPA (1/2 by volume of trioctylamine to D2EHPA) for 5 min., 30 min., and 90 min., respectively. The percent extraction of total components and the contents of Y compound (mole %) in the organic phase were respectively 4.3% (81.4 mole %), 19.1% (80.0 mole %), and 33.2% (78.3 mole %). (See FIG. 5).

What is claimed is:

1. A method for selectively extracting yttrium ions which comprises contacting an aqueous solution containing diethylenetriaminepentaacetic acid, yttrium ions, and one or more heavy rare earth (atomic number 64 to 71) ions, and having an initial pH of from 6 to 9, with a phosphoric acid ester having the formula

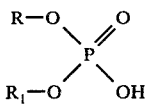

wherein R is a $C_4$–$C_{18}$ aliphatic hydrocarbon group or aryl group, and $R_1$ is a $C_4$–$C_{18}$ aliphatic hydrocarbon group, aryl group, or hydrogen atom.

2. The method of claim 1, wherein said phosphoric acid ester is di-(2-ethylhexyl) phosphate which is used by diluting with an organic solvent selected from the group consisting of $C_{10}$–$C_{14}$ aliphatic hydrocarbons and $C_6$–$C_{10}$ aliphatic alcohols.

3. The method of claim 1, wherein said phosphoric acid ester is di-(2-ethylhexyl) phosphate which is used by diluting with an organic solvent selected from the group consisting of ethylbenzene, a mixture of trioctylamine-kerosene, a mixture of trioctylamine-toluene, a mixture of tributyl phosphate-kerosene and a mixture of tributylphosphate-toluene.

4. The method of claim 1, wherein the total concentration of yttrium ions and heavy rare earth ions in said aqueous solution is from 0.005 to 2 mole/liter.

5. The method of claim 1, wherein said phosphoric acid ester is present in an amount of from 1.5 to 3 equivalents, relative to the total of yttrium ions and other rare earth ions.

6. The method of claim 1, wherein the amount of said diethylenetriaminepentaacetic acid present in said aqueous solution is from 0.4 to 1.5 equivalents relative to the total of yttrium ions and heavy rare earth ions in said aqueous solution.

7. The method of claim 1, wherein said phosphoric acid ester is dissolved in an organic diluent at a concentration of from 0.1 to 1.5 mole/liter.

* * * * *